United States Patent [19]

Nakao et al.

[11] 3,835,266

[45] Sept. 10, 1974

[54] HOLLOW CARBONACEOUS MICROSPHERES SUITABLE FOR USE IN CARBON MICROPHONES

[75] Inventors: Masaaki Nakao, Urawa; Zenya Shiiki; Yasuo Amagi, both of Tokyo, all of Japan

[73] Assignee: Kureha Kagaku Kogyo Kabushiki Kaisha, Tokyo, Japan

[22] Filed: Dec. 29, 1971

[21] Appl. No.: 213,751

[30] Foreign Application Priority Data
Dec. 29, 1970 Japan.............................. 45-120975

[52] U.S. Cl. ............................................... 179/190
[51] Int. Cl.............................................. H04r 21/02
[58] Field of Search ............ 179/122, 190; 423/445, 423/449; 264/29

[56] References Cited
UNITED STATES PATENTS
2,697,136  12/1954  Baker et al. ......................... 179/190
FOREIGN PATENTS OR APPLICATIONS
1,458,195  11/1966  France................................ 423/445

Primary Examiner—William C. Cooper
Assistant Examiner—Thomas L. Kundert

[57] ABSTRACT

Hollow carbon microspheres suitable for use in a carbon microphone.

A process for producing hollow carbon microspheres for use in carbon microphones.

A carbon microphone containing hollow carbon microspheres.

3 Claims, No Drawings

HOLLOW CARBONACEOUS MICROSPHERES SUITABLE FOR USE IN CARBON MICROPHONES

BACKGROUND OF THE INVENTION

The majority of the carbonaceous granular materials, provided by the prior art for use in carbon microphones, are produced from smokeless coal. Another commercial source of carbonaceous granules for carbon microphones is a process wherein such granules are produced from divinyl benzene resins and phenolic resins. However, these carbonaceous granules are deficient in that they must be used with high electric currents because of their low sensitivity.

SUMMARY OF THE INVENTION

It has now been found that carbonaceous microspheres, having hollow structures and produced from pitch, are superior as carbonaceous granules for use in carbon microphones of high sensitivity. Such carbonaceous microspheres have smooth surfaces, good mobility, and thin wall thicknesses which permit deformation of the walls in response to sound pressure changes.

Thus, it is an object of this invention to provide hollow carbonaceous microspheres suitable for use in carbon microphones.

It is another object of this invention to provide a process for producing hollow carbonaceous microspheres suitable for use in carbon microphones.

It is yet another object of this invention to provide a carbon microphone employing hollow carbon microspheres.

Other objects of the present invention will become apparent from the detailed description to follow.

DESCRIPTION OF THE PREFERRED EMBODIMENTS

The present invention involves the treatment of hollow carbonaceous microspheres to optimize their efficiency when used in a carbon microphone. These microspheres are hard carbon of low graphitization and low open pore content. The carbon microspheres are preferably those having a particle size of 50 microns to 1,000 microns, a wall thickness of 2 microns to 50 microns, and a particle density of 0.15 to 1.0 grams per cubic centimeter. The hollow carbonaceous microspheres are prepared from pitches of petroleum or coal by dispersing the pitch in an aqueous medium to form microspheres, foaming the microspheres by heat application to form hollow structures, "infusibilizing" (heat-treating) them to raise their softening points, and finally, carbonizing the microspheres. This process for preparation of hollow carbonaceous microspheres is disclosed in greater detail in our U.S. application Ser. No. 147,712, filed May 27, 1971, the teachings of which are herein incorporated by reference.

The hollow carbonaceous microspheres, prepared as described in application Ser. No. 147,712 may be used, as is, in carbon microphones. However, it has been discovered that an additional treatment step may be employed to optimize their electrical resistance and open pore content. This additional treatment is performed by heating the carbonization microspheres at a temperature between the carbonization temperature (900° C) and 2,000° C. The time for this additional treatment is preferably within the range of 10 to 200 minutes. The optimization treatment is performed in an inert or carbonizing atmosphere. Oxidizing and reducing atmospheres are not suitable for this purpose.

The preferred inert atmosphere is one containing gaseous nitrogen, argon, helium or mixtures thereof. If a carbonizing atmosphere is used, the preferred atmosphere is one containing a hydrocarbon having 1 to 10 carbon atoms in the molecule or a gaseous aromatic hydrocarbon. A mixture of such hydrocarbons, diluted with an inert gas, may also be used. The carbonizing atmosphere is the preferred atmosphere because the products which have been treated in this manner show a lower open pore content.

When the treated hollow carbon microspheres of this invention are employed in a carbon microphone, it is possible to operate the microphone at a given level of performance with lower electrical currents and power inputs than are required when a microphone containing the conventional carbonaceous granules is used. The carbonaceous microspheres have been found to be far superior in terms of sound pressure sensitivity, frequency response, and durability, to known conventional carbonaceous granules.

This invention will be illustrated in more detail by way of the following example, however, the example is not intended to limit the scope of this invention.

EXAMPLE

1. Preparation of the starting pitch:

A pitch having a softening point of 190°C was obtained by spraying Ceria crude oil into steam superheated at 1800°C to effect thermal cracking. The resultant tar was distilled to remove fractions having low boiling points, below 500° C. Ten parts by weight of this pitch was mixed with 2.25 parts by weight of benzene and the benzene-containing pitch was dispersed in water, containing partially saponified polyvinyl acetate as a suspending agent, to form microspheres.

2. Preparation of hollow carbonaceous microspheres:

The microspherical pitch, prepared in step 1, was air dried to remove a part of benzene, decreasing the content of benzene to 5 percent by weight. The pitch was then heated rapidly at 165° C to cause foaming to form hollow structures. The resulting hollow microspherical pitch was heated from 120° to 260° C at a temperature elevation rate of 20° C/hr. in air containing 1 percent of $NO_2$ gas to raise the softening point of the pitch ("infusibilization"). It was then heated from 400° to 850° C, at a temperature elevation rate of 150° C/hr, in a nitrogen stream to produce hollow carbonaceous microspheres which had an average particle size of 150 $\mu$, an average wall thickness of 5 $\mu$ and an average particle density of 0.35 g/cc.

3. After-treatment of the hollow carbonaceous microspheres:

Portions of the hollow carbonaceous microspheres produced above were subjected to heat treatment at 1,010° and 1,230° C, respectively, for 3 hours in a $N_2$ stream. Another portion of the hollow carbonaceous microspherical product was subjected to heat treatment conducted at 1,100° C for 3 hours in an argon atmosphere containing 15 percent by volume methane. The resulting hollow microspheres were screened with a series of sieves to obtain particles of sizes ranging from 147 to 246 microns and tested to determine their performance when used in carbon microphones. The testing method involved plugging carbon microphones, made with the hollow microspheres produced as above, into a commercially available transmitter (Iwazaki Tsushinki, Model T-4) to measure their sensitivity. For comparison, the sensitivity of a commercially available carbonaceous granule I was also measured at the same time. The test results were as shown in Tables 1 and 2.

Table 1

| Size: | particle size 147–246 μ, particle density 0.38 g/cc |
|---|---|
| Heat Treatment: | time 3 hours, nitrogen atmosphere |
| Measurement: | frequency 100 Hz sound level 90 dB |

| Treating temperature | Supplied electric current (mA) | Static resistance | Sound pressure sensitivity | Electric power sensitivty |
|---|---|---|---|---|
| 1010°C | 2.5 | 235 Ω | −34.5 dB | −58.2 dB |
| 1010°C | 5 | 230 | −31.8 | −55.3 |
| 1010°C | 10 | 226 | −28.8 | −52.0 |
| 1230°C | 2.5 | 120 Ω | −36.4 dB | −59.1 dB |
| 1230°C | 5 | 112 | −33.7 | −56.3 |
| 1230°C | 10 | 110 | −30.8 | −53.0 |
| Commercially available carbonaceous granule I | 2.5 | 47 Ω | −39.2 dB | −68.1 dB |
| | 5 | 46 | −36.5 | −63.4 |
| | 10 | 45 | −34.4 | −59.0 |

Table 2

| Size: | particle size 175–246 μ, particle density 0.29 g/cc |
|---|---|
| Heat Treatment: | time 3 hours, argon atmosphere containing 15% CH$_4$ |
| Measurement: | frequency 1000 Hz, sound level 90 dB |

| Treating temperature | Supplied electric current (mA) | Static resistance | Sound Pressure sensitivity | Electric power sensitivity |
|---|---|---|---|---|
| 1010°C | 5 | 213 Ω | −32.7 dB | −55.8 dB |
| 1100°C | 10 | 210 | −27.8 | −52.5 |

We claim:
1. A carbon microphone comprising carbonaceous granules in the form of hollow carbon microspheres formed from a pitch of petroleum or coal, said hollow carbon microspheres having been heat treated at 900° to 2,000° C in an atmosphere of an inert gas, hydrocarbons having 1 to 10 carbon atoms, aromatic hydrocarbons, or a mixture thereof.

2. The carbon microphone of claim 1 wherein said hollow carbon microspheres have a particle size of 50 microns to 1,000 microns, a wall thickness of 2 microns to 50 microns, and a particle density of 0.15 to 1.0 grams per cubic centimeter.

3. The microphone of claim 1 wherein said microspheres are produced by a process comprising:
   1. dispersing pitch in an aqueous medium to form microspheres;
   2. foaming the microspheres by application of heat to form hollow structures;
   3. heating treating said hollow carbon microspheres to raise their softening points;
   4. carbonizing said hollow carbon microspheres; and
   5. heating said hollow carbon microspheres at 900°C to 2,000° C in an atmosphere of an inert gas aromatic hydrocarbons which are gaseous within the specified temperature range, or a mixture thereof.

* * * * *